(12) United States Patent
Herriot et al.

(10) Patent No.: US 9,407,575 B2
(45) Date of Patent: Aug. 2, 2016

(54) TELECOMMUNICATIONS SYSTEM AND METHOD

(71) Applicant: Vodafone IP Licensing Limited, Newbury, Berkshire (GB)

(72) Inventors: Nicholas Herriot, Newbury (GB); Ashley Mills, Newbury (GB); David Lister, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 96 days.

(21) Appl. No.: 13/886,089

(22) Filed: May 2, 2013

(65) Prior Publication Data
US 2014/0146826 A1    May 29, 2014

(30) Foreign Application Priority Data
May 2, 2012 (GB) .................................. 1207671.7

(51) Int. Cl.
*H04L 12/28* (2006.01)
*H04L 12/933* (2013.01)
*H04W 4/00* (2009.01)
*H04W 4/14* (2009.01)

(52) U.S. Cl.
CPC .............. *H04L 49/15* (2013.01); *H04W 4/005* (2013.01); *H04W 4/14* (2013.01)

(58) Field of Classification Search
CPC . H04L 49/15; H04L 12/2856; H04L 41/0604; H04L 67/025; H04L 67/125; H04L 67/322; H04L 69/18; H04L 69/24; H04L 69/28; H04L 69/329; H04L 69/40; H04W 4/005; H04W 4/14; G08C 2201/42

USPC ................................................... 370/356–503
See application file for complete search history.

(56) References Cited

U.S. PATENT DOCUMENTS

| | | | | |
|---|---|---|---|---|
| 6,950,876 | B2 * | 9/2005 | Bright et al. ................... | 709/230 |
| 8,538,448 | B2 * | 9/2013 | Wieczorek et al. ......... | 455/452.1 |
| 8,589,595 | B2 * | 11/2013 | Barranco et al. .............. | 709/251 |
| 8,670,443 | B2 * | 3/2014 | Kurokawa et al. ............. | 370/352 |

(Continued)

FOREIGN PATENT DOCUMENTS

GB        2431820        5/2007
WO    WO 2011/139952    11/2011

OTHER PUBLICATIONS

GB Search Report for GB1207671.7 dated Sep. 11, 2012.

*Primary Examiner* — Nicholas Sloms
(74) *Attorney, Agent, or Firm* — Workman Nydegger (57) ABSTRACT

In a telecommunications network including a core network component and first and second telecommunications devices, with the second telecommunications device being associated with a SIM which is not directly routable in the telecommunications network in regard to communications with the first telecommunication device, a method of transmitting a communication between the first device and the second device including: the core network component receiving a communication from or for the second device via a data bearer; and configuring the core network component, to encapsulate the received communication and forward the encapsulated communication to a management server external to the telecommunications network so as to obtain appropriate routing data and/or routing authorization for the communication.

17 Claims, 4 Drawing Sheets

(56) References Cited

U.S. PATENT DOCUMENTS

| | | | |
|---|---|---|---|
| 2005/0030917 A1* | 2/2005 | Haller et al. | 370/328 |
| 2007/0169107 A1* | 7/2007 | Huttunen | H04L 29/06 717/174 |
| 2008/0153521 A1* | 6/2008 | Benaouda | G01D 4/004 455/466 |
| 2011/0317673 A1* | 12/2011 | Shelby | 370/338 |
| 2013/0225130 A1* | 8/2013 | Rost | H04L 63/104 455/411 |

* cited by examiner

TELECOMMUNICATIONS SYSTEM AND METHOD

CROSS REFERENCE TO RELATED APPLICATIONS

This application claims priority to United Kingdom Application Number 1207671.7, filed on May 2, 2012, the entirety of which is incorporated herein by reference.

SUMMARY OF THE INVENTION

The present invention relates to a telecommunications system and associated methods. More particularly, the present invention relates to a telecommunications network that includes M2M devices and methods of transmitting data from and/or to such M2M devices in a mobile telecommunications network environment. Even more particularly the present invention relates to systems and methods of transmitting and routing communications between M2M devices and telecommunications devices such as smart phones. Still more particularly the present invention relates to M2M devices that are not directly routable across a telecommunications network by other telecommunications devices.

BACKGROUND

Machine to Machine (M2M) is a technology that enables multiple devices to exchange and/or share information without the need for human intervention using both wireless and wired communication networks. For example, M2M devices typically include a sensor or meter to capture information, such as temperature or a meter reading, and a wireless transmitter for transmitting the sensed data/measurements through a communication network to a remote server. The remote server is typically a central hub that receives information from multiple M2M devices for processing. M2M devices are also ideally capable of receiving data, such as remote instructions and software updates. M2M devices are also sometime described as "smart" devices or telemetry devices.

The applicability of M2M technology is ever growing, and covers many and varied fields of technology. With ever increasing costs, more regulatory compliance and industry consolidation, many utility industries are redesigning their business models to become more agile and responsive. Smart metering using M2M connected services to create "Smart Grids" is seen as a key development, for example to enable utility meters to relay consumption of gas or electricity every few seconds. Additionally, steps have also been taken towards mobile health monitoring solutions that are set to transform healthcare by providing doctors with real-time information about patients' cardiac health and certain vital signs remotely.

Other examples of M2M applications include:
- Telematics that allow cars and lorries to report location, engine management information, logistics tracking or provide driver services like remote assistance;
- Security alarms that can contact control centres;
- Office equipment such as lifts and printers that can alert service issues;
- Credit card readers or cash tills (EPOS systems) that can be used where ever a mobile signal exists;
- Stock control terminals that can link to supply chain systems;
- Asset tracking, particularly where performance of critical equipment is vital like oil rigs and construction sites.

It is possible for M2M devices to communicate with remote entities using mobile telecommunications networks where they are provisioned with a SIM card, which provides them with a traceable identity within the mobile telecommunications network. The use of M2M devices in mobile networks has increased the utility and geographic scope of M2M services in various industries. In view of this, platforms are being created to assist companies in managing their M2M devices, particularly on a global scale. In this regard Vodafone have developed a dedicated platform (commonly known as the Generic Data Service Platform, GDSP) for this purpose. This M2M service platform is a centrally hosted portal that optimises large scale and multi-country deployments of M2M solutions. This dedicated platform arrangement is essentially managed by a separate proprietary telecommunications Core Network that is deployed in parallel to the global radio subsystem. The two are interconnected, typically at the RNC level. The M2M devices of such a GDSP are commonly referred to as GDSP devices.

Relative to mobile phones and the like, M2M devices infrequently, and sometimes never, utilise the public telecommunications network. Therefore allocating all M2M devices with SIMs with dedicated MSISDNs can be a wasteful way of enabling M2M devices in telecommunications networks. In this regard, MISISDNs need to be registered in the operating company's network in order to be usable, and also need to be specifically assigned to operating companies by regulators, such as the International Telecommunications Union (ITU). Therefore, in view of the importance of these numbers, allocating a SIM with an MSISDN to each M2M device substantially increase both cost and workload overheads for network operators. This is therefore an inhibiting factor to rolling out M2M devices on a wider scale (e.g. all new vehicles and to all new gas/electricity meters on properties).

UK patent application GB 0805964.4 describes one solution to address this problem, relating to the provision of token identification modules, or TIMs. Typically, a TIM card has the same form as a SIM card and is interchangeable therewith. Just like SIM cards, TIMs are pre-programmed with at least one unique identification number, the "International Mobile Subscriber Identity" (IMSI) which is accessible on the card. However, the TIM is not associated with a publicly known number (i.e. a MSISDN). In this sense, the TIM is considered to be an "unprovisioned" SIM, as it has not yet been associated with a particular subscriber.

As TIMs have no MSISDN permanently associated with them, they can be used in environments where it is uncertain when any given TIM will be used or indeed whether that TIM will be used at all. This is commercially important in typical cellular networks where there is a cost associated with provisioning a SIM with a valid MSISDN and a further cost associated with quarantining and ultimately reassigning that MSISDN number when it is unused for a predetermined period (typically of the order of six to nine months).

Whilst such a solution improves the financial viability of widespread M2M implementation, there is still a need to improve the communicability of such M2M devices.

More specifically, by not provisioning M2M devices with MSISDNs, their utility is enhanced (by making them cheaper to implement, thereby enabling their prevalence to be increased) but new problems are created, particularly in regard to the manner of communicating with M2M devices since they are no longer directly routable in cellular networks. In this regard, the lack of MSISDN makes it impossible to identify the location of M2M devices using the standard PLMN (Public Land Mobile Network) configuration.

This problem is particularly acute when it is considered that M2M devices are becoming more personalised, providing consumers with enhanced access to products with different functionalities. For instance, as indicated above, one application of M2M devices is smart metering, where meters are able to communicate their readings to a remote centralised server, typically via the Internet. A desirable enhanced functionality would be for the owner of that meter to be able to themselves obtain a reading for the meter so that they can personally keep track of their energy usage, for instance via an app on their mobile terminal (e.g. smart phone). To achieve this functionality, the M2M device needs to be able to communicate with the user's mobile terminal using cellular telecommunications networks.

The present invention seeks to overcome or at least ameliorate at least one of the problems of the prior art.

SUMMARY OF THE INVENTION

According to a first aspect of the invention, there is provided a management server in communicable relation with a telecommunications network, the server configured to enable communications between first and second telecommunications devices, where the second telecommunications device is not directly routable in the telecommunications network in regard to communications with the first telecommunications device, the management server being configured to: receive a communication being transmitted between the first device and the second device, the communication having been diverted from the telecommunications network; adapt the communication so that is routable in the telecommunications network towards the first or second device; and return the adapted communication to the telecommunications network.

Where the diverted communication is a communication from the first device that is directed towards the second device, the management server is preferably further configured to adapt the communication by incorporating an identifier of the second device into the communication that is routable in the telecommunications network. Preferably the diverted and adapted communications are SMS messages.

Where the diverted communication is a communication from the second device that is directed towards the first device, the management server is preferably further configured to adapt the communication by placing communication data from the diverted communication into a format that is routable in the telecommunications network towards the first device. Preferably the diverted communication is a USSD message and the adapted communication is an SMS message.

In this way the external management server acts as an interface between the first and second devices. It provides a mechanism of matching up the unroutable second device (i.e. an M2M device) with a telecommunications network.

The M2M devices to which the present invention applies may be static or moveable (e.g. associated with a vehicle). They may be consumer devices or associated with such devices. They may also perform various functionalities, such as metering or monitoring. The main requirement of the herein-defined M2M device is that it is linked with a smart card, such as a SIM, that enables it to receive and/or send communications via a wireless telecommunications network but not be directly routable in the telecommunications network (e.g. in the usual sense of having an MSISDN allocated).

In this way, the present invention is able to route data between a mobile terminal (i.e. a user's PLMN device) and an M2M device, which heretofore has not been possible, except where the M2M devices include a standard routable SIM. The present invention is therefore particularly useful for M2M devices that include a smartcard/SIM that is non-routable from the perspective of other network users. Preferably the user's PLMN device communicating with the M2M device is authorised to do so, such as by being paired with the M2M device.

These aspects of the invention are particularly useful for transmitting low cost telemetry data to and/or from small M2M devices and/or between M2M and PLMN devices.

Other aspects of the invention are described in the following numbered paragraphs:

1. In a telecommunications network including a core network component and first and second telecommunications devices, where the second telecommunications device is not directly routable in the telecommunications network in regard to communications with the first telecommunication device, a method of transmitting a communication between the first device and the second device at least partially using the telecommunications network including:
   the core network component receiving a communication from or for the second device via a data bearer;
   configuring the core network component, to forward the communication to a management server external to the telecommunications network so as to obtain appropriate routing data and/or routing authorisation for the communication.

2. The method of paragraph 1 further including configuring the core network component, upon receiving a communication intended for the second telecommunications network device, to encapsulate the received communication in a transmission protocol compatible with the management server and forward the encapsulated communication to the management server.

3. The method of any one preceding paragraph wherein the communication is an SMS message and includes an identifier of the second device that is not usable by the telecommunications network to route the SMS message, and the external management server is capable of adapting the SMS message so as to include an identifier of the second device that is routable within the telecommunications network, and the method further includes:
   the core network component receiving an adapted version of the SMS message from the external management server, which includes an identifier for the second device that is routable in the telecommunications network; and
   placing the adapted version of the SMS message on an SMS bearer for transmission towards the second device.

4. In a telecommunications network including at least one core network component and first and second telecommunications devices, where the second telecommunications device is not directly routable in the telecommunications network in regard to communications with the first telecommunication device, a method of enabling the second device to communicate with the first telecommunications device at least partially using the telecommunications network including:
   configuring the second telecommunications device to use a USSD command to direct communication data intended for the first telecommunications device to a management server, wherein the USSD command instructs a first core network component to forward the communication data to a management server, such that the management server is external to the telecommunications network and capable of redelivering the communication data to the telecommunications network for delivery to the first telecommunications device.

5. The method of paragraph 4 wherein the first core network component is a core network home location register and the method further includes the home location register encapsulating data from the received communication according to a transmission protocol compatible with the management server and forwarding the encapsulated data to the management server.
6. The method of paragraph 5 wherein the transmission protocol used by the home location register is Internet Protocol, IP, and the home location register forwards the encapsulated data to the management server via the Internet.
7. The method of paragraph 4, 5 or 6 wherein the management server is configured to redeliver the communication data to the telecommunications network by:
   creating an SMS message addressed to the first device which includes the communication data; and
   encapsulating the SMS message in a suitable protocol and forwarding the encapsulated message towards a second core network component that is capable of decapsulating the SMS message and transmitting the SMS message towards the first device on an SMS bearer.
8. The method of any one preceding paragraph wherein the second telecommunications device is not directly routable in the telecommunications network due to being associated with a SIM which has not been allocated an MSISDN.

BRIEF DESCRIPTION OF THE DRAWINGS

For a better understanding of the present invention, reference will now be made, by way of example only, to the accompanying drawings in which.

DETAILED DESCRIPTION

Figure 1:
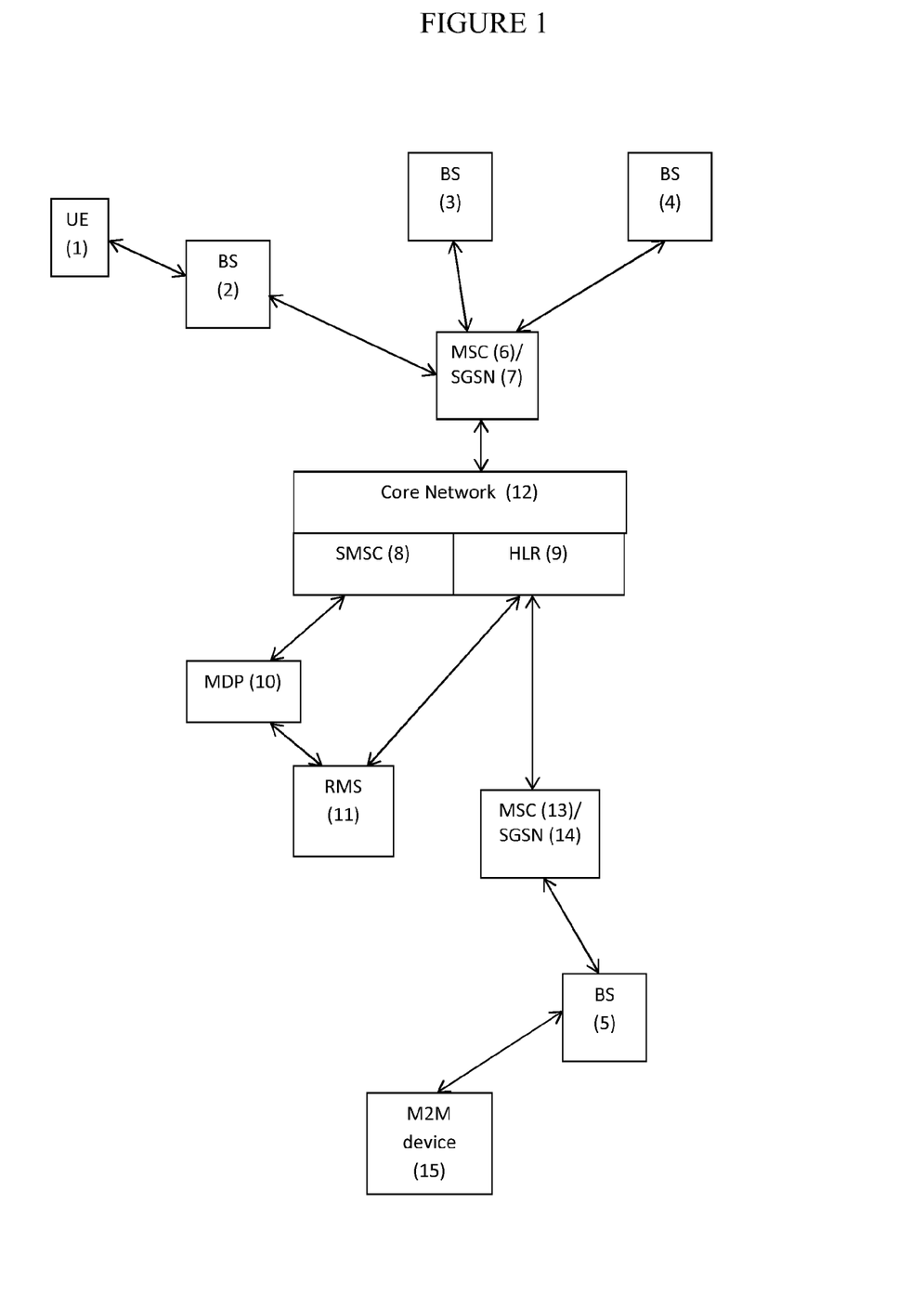
FIG. 1 illustrates a network configuration according to an embodiment of the invention.

FIG. 1 illustrates the interrelationship of key elements of a cellular telecommunications network according to an embodiment of the invention. The telecommunications network includes a plurality of base stations (2, 3, 4, 5) and a core network 12.

Each base station, BS, corresponds to a respective cell of the telecommunications network and receives voice and data communications from and transmits such communications to terminals (e.g. UE1) in that cell by wireless radio communication in one or both of the circuit switched or packet switched domains. The terminal (1) may be any wirelessly communicable device such as a handheld mobile telephone, a smart phone, a telemetry device (e.g. a PLMN-based M2M device), a personal digital assistant (PDA) or a laptop computer equipped with a datacard.

Conventionally, the base stations comprise the radio access network and are arranged in groups. Each group of base stations is typically controlled by a mobile switching centre, MSC, such as MSC6 for base stations BS2, BS3 and BS4. As shown in FIG. 1, the network has another MSC, identified as MSC13 which is controlling a further base station BS5. In practice, the network will incorporate many more MSCs and base stations than shown in FIG. 1.

MSC6 and MSC13 support communications in the circuit switched domain—typically voice calls. Corresponding network gateway components, SGSN7 and SGSN14, are provided to support communications in the packet switched domain—such as GPRS data transmissions. SGSN7 and SGSN14 function in an analogous way to MSC6 and MSC13.

Conventionally, mobile terminals are able to utilise the packet switched domain to transmit Short Message Service, SMS, messages between terminals. This is achieved using a network element, the Short Message Service Centre, SMSC 8.

When a user sends an SMS message, intended for receipt by another user, from their terminal, the message will be directed by their serving base station and SGSN to the SMSC. The SMSC then stores the message and determines if it possible to route the message towards the intended recipient. The stored message will be delivered to the destination user when they are available.

The network components described in FIG. 1 are 3G UMTS network components. It is to be appreciated, however, that this is not essential to the operation of the invention, and that other network configurations are possible, including 2G and 4G networks. The main operational requirement for the embodiments of the invention that will be described is that these networks are capable of communicating using low cost data bearers, such as the Short Message Service (SMS) and/or Unstructured Supplementary Service Data (USSD).

In this regard, USSD is another technology that enables data to be transmitted in telecommunications networks. It is a protocol used by GSM cellular devices to communicate with its service provider. USSD technology is defined in GSM standard 02.90 (USSD Stage 1) and 03.90 (USSD Stage 2).

A key characteristic of USSD is that the subscriber does not have to get special software for the handset or special SIM cards to be able to use USSD. In this regard, USSD commands are routed back to the home mobile network's Home Location Register (HLR), allowing for the ability of services based on USSD to work just as well when users are roaming USSD is commonly used by pre-paid GSM cellular phones to query the available balance. GSM is a 2G technology, but the majority of current mobile terminals still support it (i.e. to ensure backwards compatibility).

With this background in mind, embodiments of the present invention will now be described, which utilise low cost bearers, such as the SMS bearer and USSD bearer. In these embodiments, the M2M devices are associated with a SIM that is not directly routable in the telecommunications network. Instead of a standard MSISDN, the SIM of each M2M device in these embodiments is assigned a non-routable MSISDN which does not match the format of standard MSISDNs, such as the ITU's country code numbering system for phone numbers, E164. As indicated above, whilst this does result in substantial cost savings, it does complicate the ability to communicate with the M2M devices via a telecommunications network.

Therefore, according to a first embodiment of the invention, an approach is provided that enables such an M2M device (15) with a non-routable MSISDN to be paired with one or more normal Public Land Mobile Network (PLMN) devices at least partially via a cellular telecommunications network. For instance, the M2M device may be a home heating controller and be paired to a number of PLMN devices (e.g. smart phones belonging to residents of the house). This allows the users of the smart phones to have remote access to that controller.

The pairing procedure serves to associate the M2M device with the one or more PLMN devices and can be used as a form of authorisation to ensure that not just any PLMN device can communicate with a given M2M device.

Figure 4:
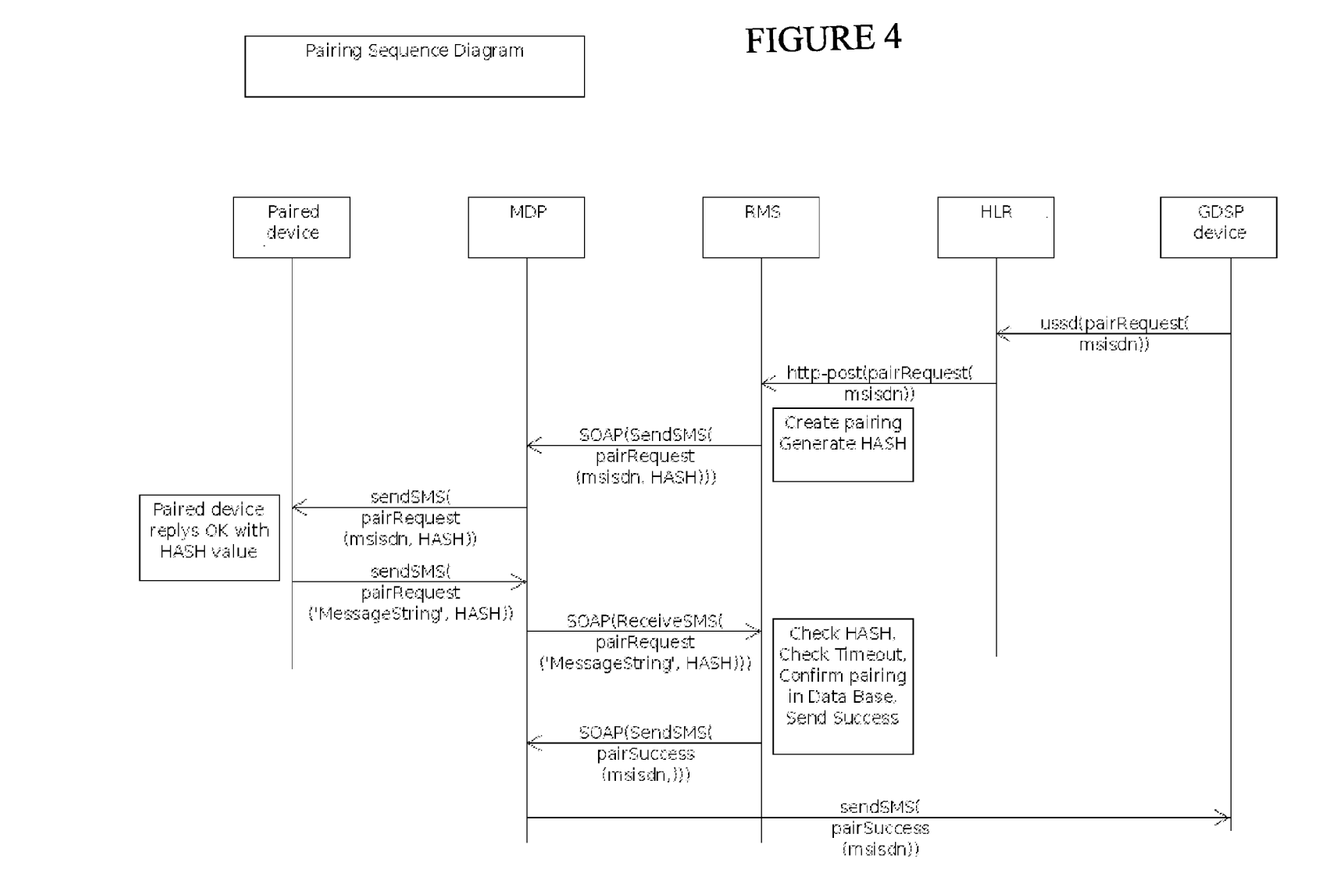
FIG. 4 illustrates a sequence diagram for a pairing process using USSD according to another embodiment of the invention.

Once the pairing has been achieved (the pairing procedure will be described subsequently in relation to FIG. 4), the paired PLMN device may communicate with the M2M device, as and when desired. The signalling that is involved to establish such a communication according to an embodiment of the invention is illustrated in FIG. 2.

Messaging the M2M Device Using SMS

In this embodiment, where a user of a paired PLMN device (1) wishes to, for example, instruct the M2M device (15) to perform a certain function, the instruction will be sent in the form of an SMS. Referring to step 1 of FIG. 2, the PLMN device is illustrated as a smart phone which sends a mobile-originating SMS message (MO-SMS) towards the M2M device (15). This message will be directed by the smart phone's serving base station (2) to the core network (12), where it will be received by the core network's SMSC (8). As discussed in relation to FIG. 1, the SMSC (8) is responsible for routing SMS messages, and will store each message until it is possible to route them towards the intended recipient.

Figure 2:
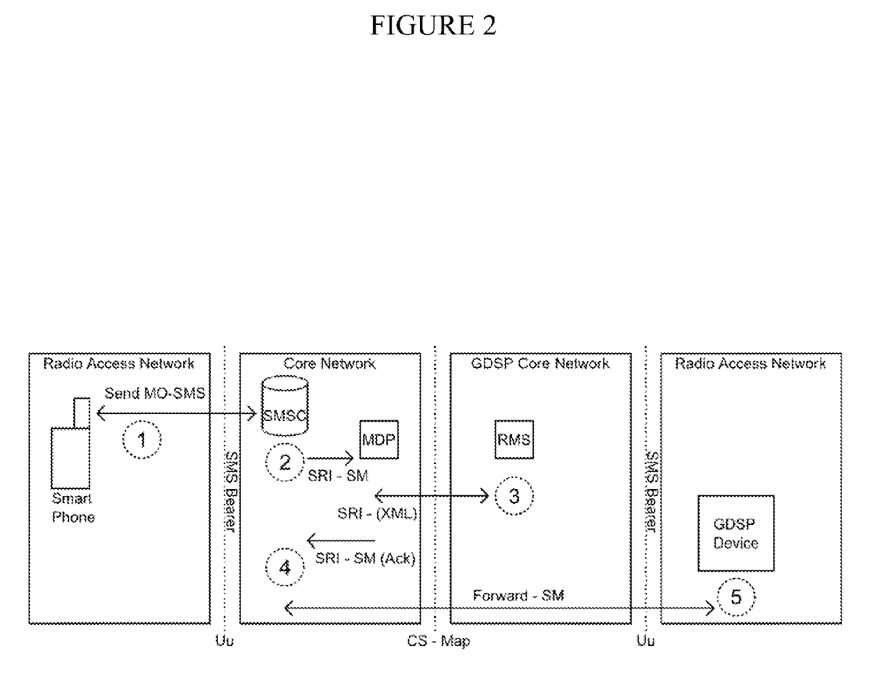
FIG. 2 illustrates a message flow for a paired mobile device to message a M2M Device using SMS according to an embodiment of the invention.

The MO-SMS message illustrated in FIG. 2 is sent on an SMS bearer across the Uu interface according to the SMS standard and includes a payload (i.e. the data intended for the M2M device), an identifier of the source terminal (1), and an identifier for the M2M device (15) as the intended recipient.

Usually the identifier of the intended recipient would be their MSISDN. The MSISDN is not a direct mapping to a mobile handset, or even to the SIM card. However, the MSISDN does allow the SMSC (8) to determine the country and mobile operator that a subscriber number belongs to; and from that the SMSC can query (using an SRI-SM message) the appropriate mobile operator's HLR (Home Location Register) for information used to route the SMS to the handset (i.e. the HLR should contain the last known location of the intended recipient).

In the present embodiment of the invention, however, the identifier of the M2M device (as the intended recipient) will be an alternative identifier (e.g. a short code) that will not be recognisable by the SMSC (i.e. since the code will not be of a standard MSISDN format). Therefore, the SMSC (8) will not be capable of identifying the country or mobile operator, nor of sending the SRI-SM message (i.e. the Send Routing Information for Short Message) to the appropriate HLR. Therefore, according to this embodiment of the invention, the SMSC (8) is instead configured to forward the message to a network element (10) that provides the necessary interface between the M2M device (15) and the telecommunications network (see FIG. 2 step 2). The message forwarding by the SMSC (8) can be effected by any suitable means, such as a default operation upon not recognising the intended recipient identifier, or by associating the short code identifier with an address for the additional network element (10).

This additional network element (10) may be a new physical entity in the telecommunications network or implemented in software associated with an existing network element (e.g. as a component of the SMSC 8). This additional network element (10) is herein termed the Message Delivery Platform (MDP).

The non-routable MSISDN of the M2M device (15) is preferably a short code that the MDP (10) can in turn use to determine routing data for the M2M device. In this regard it is to be appreciated that the short code could identify the target M2M device uniquely.

Alternatively, the short code could also act as a referral address that enables the SMSC and MDP to forward the packet. In this alternative embodiment, a single short code could be used for a large range of M2M devices: so that entities to which the SMS is forwarded can identify the target M2M device, information identifying the target M2M device may be sent in the payload.

As to determining the routing data, this can be achieved by the MDP within the core network upon determining the IMSI of the target M2M device. Alternatively, the MDP (10) may access a management server (11) external to the telecommunications network to obtain the routing information for the M2M device. This external server (11) is a trusted source and is herein termed the RMS (Routing Management Server). The MDP (10) communicates with the RMS (11) across the internet (ideally via a secure network connection) using Representational State Transfer (REST)ful services and an appropriate protocol, such as the Mobile Application Part (MAP) protocol (e.g. CS-Map) or Simple Object Access Protocol (SOAP).

Where the M2M device (15) is associated with a management platform (e.g. GDSP), the RMS (11) is ideally a component of the GDSP network, so that the MDP (10), as a component of the core telecommunications network, queries a component (11) of the GDSP network, to determine the routing data for the M2M device (see FIG. 2 step 3). This would enable the M2M device data to be stored centrally in the GDSP network, simplifying updates. In this way the MDP would act as an interface between the mobile telecommunications network and the GDSP network.

Preferably, the RMS (11) (or the MDP when no GDSP platform is used) also determines whether the source of the SMS message (i.e. the smart phone 1) is paired to the M2M device, and therefore authorised to communicate with the M2M device. In this regard, the RMS (11) would have access to a record of "who can communicate with whom" and essentially act as a gatekeeper for enabling communications. In the event that the smart phone (1) is not paired with the M2M device (15), the SMS forwarding procedure can be terminated.

Otherwise the MDP (10) sends the determined routing data to the SMSC (8) in an SRI-SM (Ack) (see FIG. 2 step 4). The routing data will typically include the M2M device's IMSI and an appropriate RAN address (e.g. the address of the M2M device's serving BS/SGSN). Once the SMSC (8) has received the routing data from the MDP (10), the SMSC can then send a "ForwardSM" message on the SMS bearer (step 5) to the appropriate RAN address, addressed to the M2M device's IMSI. Note that this final instruction is part of the SMS standard, and is deliverable to the M2M device (15) without the present invention necessitating alterations. In particular, it is to be appreciated that once the SMSC (8) receives the SRI-SM (Ack), the stored SMS message can then be directly routed to the M2M device, as its IMSI address is used for delivering the SMS, not the MSIDSN (i.e. the IMSI address is still stored on the M2M device's SIM).

The home heating controller (15), upon receiving the SMS instruction from the user's paired smart phone (1), can then respond accordingly, such as by turning on the heating if so instructed.

In this way, by adapting the SMSC (8) to seek routing data from an entity able to act as an interface between the telecommunications network and the M2M environment (i.e. the MDP), it becomes possible to incorporate the M2M device into the routing procedures of the telecommunications network, but without registering the M2M device with the telecommunications network. Essentially, this embodiment of the invention provides an interface for and mediation with elements of the telecommunications network (e.g. the SMSC) in order to implement the enhanced functionality in respect of M2M devices. This has significant cost savings and only requires minimal changes to the network operation.

Messaging the M2M Device Using USSD

In an alternative embodiment of the invention, the user mobile terminal (1) can also message the M2M device (15) using USSD, rather than SMS.

In this regard, a user of a smart phone paired to a particular M2M device can transmit an instruction/message to the M2M device by transmitting the message/instruction using USSD. The USSD bearer is accessed by calling a number that starts with an asterisk (star) or gate (hash) characters ("*" or "#") and then a combination of numerals, asterisks and finally a gate or hash character "#". A handset recognizes such numbers and use the USSD bearer. There is a whole set of preset commands for call-forwarding and for other purposes that work on all GSM telephones. Combinations that have not been reserved can be used for other services.

The USSD message generated on the mobile terminal (1) will be transmitted by the USSD bearer to the user's core network (12). The USSD message will include a code identifying the M2M device (i.e. the intended recipient), a payload (i.e. the instruction to be forwarded) and ideally a *# scheme usable by a core network entity (e.g. HLR 9) for forwarding the USSD message to a server specifically designed for handling such messages to M2M devices that are not directly routable. In this regard, the HLR (9) may forward the USSD message directly to the RMS (11), or to the RMS via the MDP (10). Where the message is forwarded directly to the RMS, the HLR will need to encapsulate the USSD message in a suitable protocol for transmission to the RMS, since the RMS is an external server (e.g. using HTTP).

The RMS (11) operates as a dynamic real-time gatekeeper for the routing and pairing functions, being responsible for overriding basic network control and performing the correct routing functions where a pairing exists. It uses the shortcode identifying the M2M device to obtain routing data for the M2M device, preferably including the IMSI address of the M2M device. Having obtained the routing data, the RMS (11) then converts the USSD message into a message conforming to the SMS standard, encapsulates it using a suitable protocol, such as the Simple Object Access Protocol (SOAP), and sends the encapsulated message to the core network MDP (10). Ideally the RMS is within the core network, so this message would be sent via the internal network. Alternatively, however, the message may be sent via the Internet. The MDP is ideally a network server configured to communicate via both the Internet and the cellular telecommunications network.

The MDP will then decapsulate the SMS message and send it as a "ForwardSM" message on the SMS bearer to the M2M device's serving MSC, addressed to the M2M device's IMSI as per the previous embodiment.

The previous two embodiments described procedures for enabling a paired PLMN device to transmit a message to its paired M2M device via a cellular telecommunications network, in a situation where the M2M device is not associated with a routable MSISDN.

The M2M Device Initiating Messages Using USSD

Figure 3:
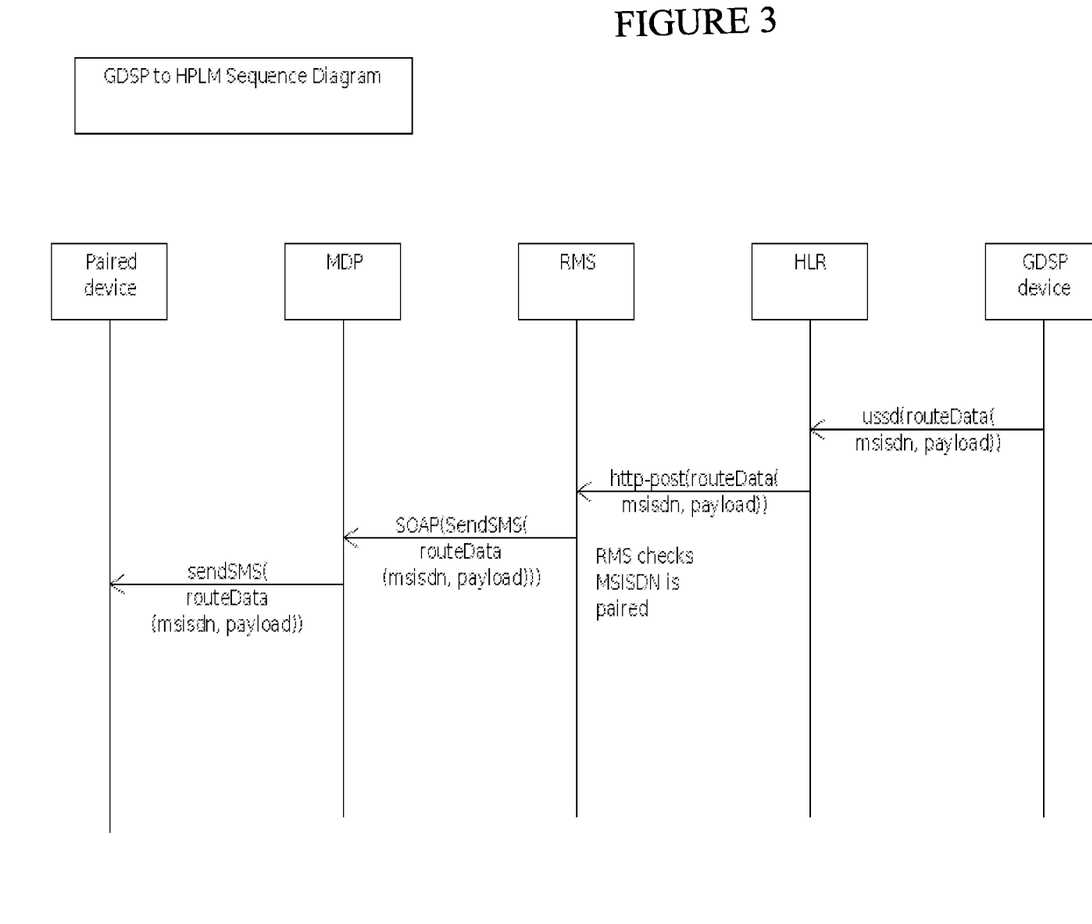
FIG. 3 illustrates a sequence diagram for a M2M Device to message a paired device using USSD according to a further embodiment of the invention.

It is also to be appreciated that a further embodiment of the invention uses a USSD bearer to enable an M2M device to send a message to one of its paired PLMN devices via a telecommunications network, despite not being provisioned with an MSISDN. An example of this embodiment of the invention is illustrated in FIG. 3.

In this regard, an important aspect of USSD is that messages from handsets are typically always routed to the home network. More specifically, messages to the numbers 100-149 are always routed to the home network, whilst other codes are routed at the discretion of a guest network. The present embodiment of the invention exploits this feature In this embodiment the M2M device (15) uses USSD to initiate a message towards a paired PLMN device (1). The USSD message will include the MSISDN of the PLMN device as the intended recipient, message payload and a specific routing instruction for the core network. This message will be sent towards a base station (5) in the vicinity of the M2M device which will, in turn forward the USSD message to the M2M device's home network.

At the M2M device's home network, a network element, such as the HLR will note the USSD routing instruction, which could, for example, be *#76. The HLR will be configured to relay all *#76 messages to an entity able to manage communications with M2M devices that are not directly routable, such as the MDP (10) or the RMS (11). The message can be routed by the HLR to the RMS via the Internet using the HTTP protocol (i.e. with a HTTP-post command).

Upon receiving the USSD message encapsulated in HTTP, the RMS will decode the message and thereby extract the payload and MSISDN of the intended recipient. Ideally the RMS will check to ensure that the intended recipient is a device having a recognised pairing with the M2M device, and thereby authorised to receive the message. If the intended recipient is not a paired device, the RMS may take no further action to transmit the message.

Otherwise, the RMS will initiate a SendSMS message to a telecommunications network element configured to communicate with it, such as the MDP (10). This SendSMS message will typically include the message payload and the MSISDN of the PLMN device as the intended recipient. This SendSMS message will be transmitted to the MDP (10), for example by encapsulating it using the Simple Object Access Protocol (SOAP). The MDP will then decapsulate the SMS message and route the message on the SMS bearer as a MT sendSMS message. This message will be received by the SMSC (8) and forwarded to the paired mobile terminal (1) in the usual manner.

Advantageously, this embodiment of the invention uses only legacy network infrastructure, and does not require the use of GGSNs, SGSNs or MSP DPS nodes. This assists in reducing the cost of the implementation. For instance, there is a cost advantage in using 2G modems over 3G modems. Further, using SMS and USSD avoids the need to invoke PDP contexts (which are required for IP connections in 3G/GPRS). This improves network efficiency, as PDP contexts require dedicated resources to maintain.

In a variation, in this embodiment of the invention, the recipient device need not be a mobile terminal, but may be device contactable via the Internet, such as a paired computer terminal belonging to a user of the M2M device. In this situation, the data can be directly routed from the RMS to an IP network address of the paired computing device.

The same messaging infrastructure as just described can also be used to implement other aspects of the invention, including pairing and unpairing PLMN and M2M devices. In this regard, a further embodiment of the invention will now be detailed with reference to FIG. 4, describing such a pairing process.

The pairing process in this instance is initiated by the M2M device. This is the preferred approach where the M2M device is "closed" to unauthorised users. The pairing request therefore is initiated by a person having authorised access to the M2M device, but the actual device being pairing need not be owned by an authorised person (i.e. anyone can respond to a pair request to create the pairing once they have received the request).

Once a pairing request is initiated at the M2M device, the M2M device sends a pairing request message towards its home core telecommunications network. This message is sent using USSD and includes an identifier of the device to be paired, such as their MSISDN. The USSD message will be received by the home core network's HLR and by virtue of an appropriate USSD command (e.g. *#76), relay the message to the RMS (11) (or via the MDP). The message may be relayed from a gateway of the telecommunications network via the Internet, by encapsulating the USSD message in HTTP.

Upon receipt of the HTTP message, the RMS will decapsulate and decode the USSD command to arrive at the pairing request. The RMS will accordingly initiate the pairing by creating a record associating an identity of the device to be paired (e.g. its MSISDN) with the M2M device. The RMS will typically generate a hash function (e.g. randomly or using an identity of one or more of the paired devices), which will be associated with a record for the pairing. The RMS will send the device to be paired a suitable verification means, such as a hash key corresponding to the hash function, in an SMS message. This message will be sent from the RMS to the MDP of the core network by encapsulating the SMS message in, for example, SOAP. The MDP will decapsulate the SMS message and send it towards the device to be paired, via the SMSC (9).

Upon the device to be paired receiving the SMS message containing the pair request and the verification data, the device will complete the pairing process. This procedure can take various forms, particularly in regard to the degree of verification required. For example, to complete the pairing the smart phone (1) may send an appropriate SMS verification response towards the RMS (i.e. by putting a short code identifier for the RMS as the destination address of the SMS). This SMS will be forwarded to the MDP (10) by the SMSC (9), and the MDP will in turn encapsulate the SMS in SOAP and send the encapsulated message towards the RMS.

As an example of the verification aspect of the pairing procedure, where the RMS sends the smart phone a hash key, the smart phone can respond with the same hash key as the means of verification. The RMS may be awaiting this response, preferably in a set time frame, before accepting the device as "paired". Once a user device, such as the smart phone is accepted as paired to an M2M device, the RMS maintains the state of the pairing and keeps a record of routing information, so that it knows how to route packets from the user device to the M2M device and vice versa.

The RMS may then send a message to the M2M device confirming that the pairing has been completed. This can be achieved by sending a message from the RMS to the MDP (for example using SOAP). Upon reception of this message at the MDP, the MDP shall initiate an SMS toward the M2M device.

Once devices are paired, they are then able to route data in a peer-to-peer fashion using the low cost legacy bearers, such as SMS and USSD, as just described. The general procedure involves encapsulating a payload within a USSD (or SMS) message which is routed towards an external management server (i.e. the RMS) via the core telecommunications network. The RMS is then responsible for delivery of the message via SMS, by reintroducing the adapted, and now routable, messages to the telecommunications network using the MDP. Alternatively, where the RMS is outside the network, a 3G/GPRS IP connection could also be used.

The embodiments of the invention described are to be taken also illustrative of the invention and not limitative, in that changes and additions are possible within the inventive concept.

The invention claimed is:

1. A method of sending a message in a telecommunications network from a mobile terminal to a Machine to Machine (M2M) device, where the M2M device has an identifier and is not directly routable in the telecommunications network by the mobile terminal, the telecommunications network including a core network, the method comprising:
   providing a management server that is in communicable relation with the telecommunications network;
   directing a communication from the mobile terminal toward the M2M device over the telecommunications network, the communication having a message that includes the M2M device identifier;
   detecting and diverting the communication by the core network of the telecommunications network;
   after the communication has been detected and diverted, the core network requesting that the management server determine routing data necessary for the communication to become directly routable to the M2M device over the telecommunications network;
   in response to the request, determining, by the management server, whether the mobile terminal has a pairing with the M2M device, and when the management server determines that the mobile terminal has a pairing with the M2M device:
   determining, by the management server, the requested routing data necessary for the communication to become directly routable to the M2M device over the telecommunications network;
   adapting the message of the communication to include the routing data so that the communication is routable to the M2M device over the telecommunications network; and
   routing to the M2M device, by the core network, the adapted communication over the telecommunications network, such that the communication is adapted and subsequently routed to the M2M device over the telecommunications network only when the mobile terminal has a pairing with the M2M device, the communication being initiated by the mobile terminal in the telecommunications network and received by the M2M device in the telecommunications network.

2. The method of claim 1 wherein the diverted communication is a USSD message and the adapted communication is an SMS message.

3. The method of claim 1 wherein the M2M device is not directly routable in the telecommunications network due to being associated with a SIM which has not been allocated an MSISDN.

4. The method of claim 1, wherein determining whether the mobile terminal has a pairing with the M2M device comprises:
   determining identities of the mobile terminal and the M2M device from the diverted communication;
   comparing the determined identities with a record of paired mobile terminals and M2M devices; and
   determining the mobile terminal and the M2M device to have a pairing where recorded as such in the record.

5. The method of claim 1, wherein the management server is external to the telecommunications network.

6. The method of claim 1, wherein adapting the message to include the routing data comprises:
transferring the message from the core network to the management server;
adapting the message, by the management server, to include the routing data; and
transferring the adapted message from the management server to the core network.

7. The method of claim 1, wherein the diverted communication and the adapted communication are SMS messages.

8. The method of claim 1, wherein detecting and diverting the communication is performed by a Short Message Service Center (SMSC) of the core network.

9. The method of claim 8, wherein adapting the message to include the routing data comprises:
transferring the routing data from the management server to the SMSC; and
adapting the message, by the SMSC, to include the routing data.

10. The method of claim 8, wherein adapting the message to include the routing data comprises:
transferring the message from the SMSC to the management server;
adapting the message, by the management server, to include the routing data; and
transferring the adapted message from the management server to the SMSC.

11. The method of claim 8, wherein detecting and diverting the communication further comprises forwarding the message, by the SMSC, to a Message Delivery Platform (MDP) of the core network, wherein communication between the core network and the management server are performed through the MDP.

12. The method of claim 8, wherein routing the adapted communication to the M2M device over the telecommunications network is performed by the SMSC.

13. The method of claim 8, further comprising attempting to recognize the M2M device identifier, by the SMSC, and
wherein the steps of determining whether the mobile terminal has a pairing with the M2M device, determining the routing data, adapting the message to include the routing data, and routing the adapted communication to the M2M device are performed in response to the SMSC not recognizing the identifier.

14. The method of claim 1, wherein adapting the message to include the routing data comprises:
transferring the determined routing data from the management server to the core network; and
adapting the message, by the core network, to include the determined routing data.

15. A system comprising:
a telecommunications network comprising:
a mobile terminal;
a Machine to Machine (M2M) device having an identifier, the M2M device not being directly routable in the telecommunications network by the mobile terminal; and
a core network; and
a management server in communicable relation with the telecommunications network,
wherein:
the core network detects and diverts a communication that includes the M2M device identifier from the mobile terminal toward the M2M device over the telecommunications network, then requests that the management server determine routing data necessary for the communication to become directly routable to the M2M device over the telecommunications network;
in response to the request of the core network, the management server determines whether the mobile terminal has a pairing with the M2M device, and if so, determines routing data necessary for the communication to become directly routable to the M2M device over the telecommunications network;
the core network or the management server adapts the message of the communication to include the determined routing data so that the communication is routable to the M2M device over the telecommunications network; and
the core network routes to the M2M device the adapted communication over the telecommunications network, such that the communication is adapted and subsequently routed to the M2M device over the telecommunications network only when the mobile terminal has a pairing with the M2M device, the communication being initiated by the mobile terminal in the telecommunications network and received by the M2M device in the telecommunications network.

16. The system of claim 15, wherein after determining the routing data, the management server returns the determined routing data to the first core network and the first core network adapts the message to include the determined routing data.

17. The system of claim 15, wherein after determining the routing data, the management server adapts the message to include the determined routing data and then returns the adapted message to the first core network for the first core network to route the adapted communication to the M2M device.

* * * * *